Feb. 19, 1963 W. H. LYON ET AL 3,078,464

MAGAZINE FOR MINIATURE MAGNETIC TAPE DICTATING MACHINE

Original Filed Oct. 27, 1958 7 Sheets-Sheet 1

INVENTORS
WILLIAM H. LYON
FRANK E. RUNGE
BY
H. G. Manning
ATTORNEY

Feb. 19, 1963 W. H. LYON ET AL 3,078,464

MAGAZINE FOR MINIATURE MAGNETIC TAPE DICTATING MACHINE

Original Filed Oct. 27, 1958 7 Sheets-Sheet 2

INVENTORS
WILLIAM H. LYON
FRANK E. RUNGE
BY
H. G. Manning
ATTORNEY

MAGAZINE FOR MINIATURE MAGNETIC TAPE DICTATING MACHINE

Original Filed Oct. 27, 1958

INVENTORS
WILLIAM H. LYON
FRANK E. RUNGE
BY
H. G. Manning
ATTORNEY

MAGAZINE FOR MINIATURE MAGNETIC TAPE DICTATING MACHINE

Original Filed Oct. 27, 1958 7 Sheets-Sheet 4

INVENTORS
WILLIAM H. LYON
FRANK E. RUNGE
BY
H. G. Manning
ATTORNEY

MAGAZINE FOR MINIATURE MAGNETIC TAPE DICTATING MACHINE

Original Filed Oct. 27, 1958

INVENTORS
WILLIAM H. LYON
FRANK E. RUNGE
BY
H. G. Manning
ATTORNEY

Feb. 19, 1963 W. H. LYON ET AL 3,078,464

MAGAZINE FOR MINIATURE MAGNETIC TAPE DICTATING MACHINE

Original Filed Oct. 27, 1958 7 Sheets-Sheet 6

INVENTORS
WILLIAM H. LYON
FRANK E. RUNGE
BY
H. G. Manning
ATTORNEY

MAGAZINE FOR MINIATURE MAGNETIC TAPE DICTATING MACHINE

Original Filed Oct. 27, 1958

INVENTORS
WILLIAM H. LYON
FRANK E. RUNGE
BY
H. G. Manning
ATTORNEY 3,078,464

MAGAZINE FOR MINIATURE MAGNETIC TAPE DICTATING MACHINE

William H. Lyon, Orange, and Frank E. Runge, Branford, Conn., assignors to The Soundscriber Corporation, New Haven, Conn., a corporation of Connecticut Original application Oct. 27, 1958, Ser. No. 769,824, now Patent No. 3,078,350, dated Feb. 19, 1963. Divided and this application Oct. 1, 1959, Ser. No. 843,861
6 Claims. (Cl. 242—55.13)

This invention relates to dictating machines and is directed particularly to a self-contained miniature dictating machine.

The principal object of the invention is to provide an improved dictating machine of the above nature which will be small enough to be held in the palm of the hand and adapted to be readily controlled for standby recording, indexing, logging, rewinding, and playback by the fingers of the same hand.

Another object of the invention is to provide a self-contained miniature dictating machine of the character described which records on magnetic tape spooled in a self-contained magazine unit that can readily be removed for storage or sound erasing and replaced by a fresh magazine.

Another object is to provide a recording tape magazine for said dictating machine having finger-actuated means for producing logging indications on an elapsed time scale so that any particular portion of the recording can be easily located and identified during playback.

Still another object is to provide a battery-operated miniature dictating machine of the character described, wherein the recording tape magazine contains at least fifteen minutes of recording time, and wherein upwards of twenty hours of satisfactory operation can be had without replacement of the battery.

A further object is to provide a miniature dictating machine of the above nature which will be simple in construction, foolproof in operation, inexpensive to manufacture, easy to manipulate, ornamental in appearance, dependable in operation and very efficient and durable in use.

Other objects, features and advantages of the invention will be apparent from the following description when read with reference to the accompanying drawings. In the drawings, wherein like reference numerals denote corresponding parts throughout the several views, FIG. 1 is a front elevational view of a miniature hand dictating machine embodying the invention.

This application is a division of our prior application filed October 27, 1958, Serial No. 769,824, entitled "Miniature Magnetic Tape Dictating Machine," and assigned to The Soundscriber Corporation of North Haven, Connecticut.

Figures 1, 2, 3:
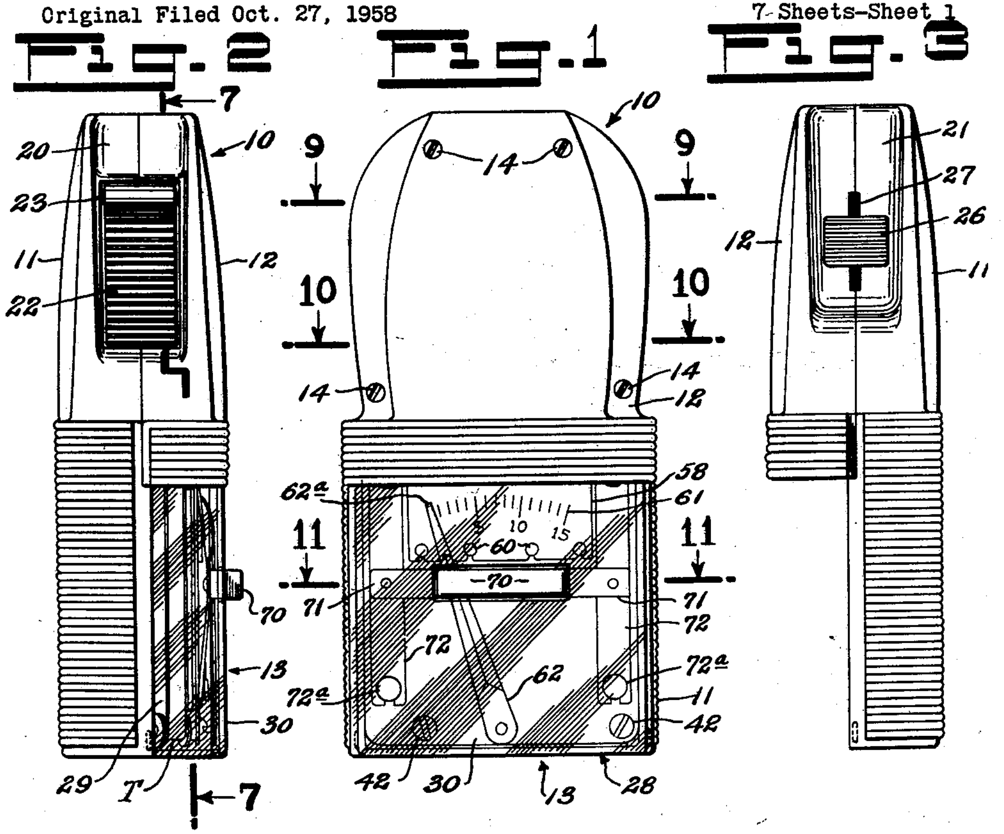
FIG. 2 is a left-hand side elevational view thereof.
FIG. 3 is a right-hand side elevational view thereof, shown with the tape magazine removed.

As best illustrated in FIGS. 1, 2 and 3, the hand miniature dictating machine 10 embodying the invention is enclosed in a two-part longitudinally-divided case, preferably molded of synthetic plastic material, having a back half 11 and a front half 12, the latter being foreshortened at its lower end to leave space for a replaceable tape magazine 13.

As can be seen in FIG. 1, the case halves 11 and 12 are held together by four screws 14. Mounted in the upper end of the case, and supported between the two halves 11 and 12, is a microphone 15 (see FIG. 7) which also serves as a loudspeaker during playback or listening.

The case also houses, in the bottom portion of the back half 11, a battery of four series-connected cells 16 (see FIGS. 8, 11) supported between spring clip connectors 17. Power from the cells 16 serves to energize a flat slow speed tape drive motor 18 (FIGS. 19–22) and a transistor amplifier 19 (FIG. 9) housed within the case halves 11 and 12.

As illustrated in FIGS. 2, 7, 9 and 10, the case halves 10 and 11 are provided with recesses 20 and 21, at the left and right hand sides respectively, near the upper end. A control lever 22, arranged in the recess 20, is pivoted at its upper end about a pin 23, and is movable through an opening in the case.

It will be apparent that the equipment is designed to fit in the hand in such a way that when it is picked up, the index finger will be in position for actuating the lever 22. Actuation of the lever 22 operates a switch 24, secured to the inside of the case half 11, through a leaf spring 25, which normally holds the lever 22 in its outermost position. Not illustrated, circuitry connected with the switch 24 applies power to the tape drive motor 18, and at the same time completes the energization circuit to the transistor amplifier 19 and the power amplifier 19*a*. The equipment is thus put into stand-by condition ready to carry out the wishes of the operator.

As is hereinbelow more fully described, a selector button 26 (FIGS. 3 and 7) extends through a slot 27 in the recess 21 at the right-hand side of the case in position for control by the user's thumb for up and down movement into "listen," "record" and "rewind" stand-by positions, after which inward pressure upon said button will carry out the selected functions.

Figures 4, 5:
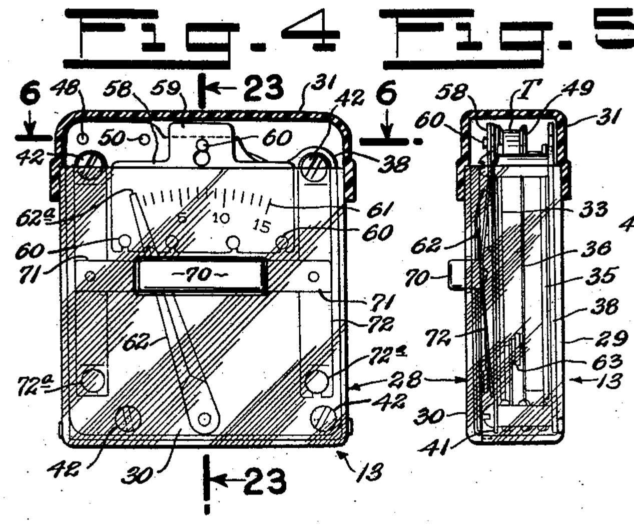
FIG. 4 is a front elevational view of the tape magazine shown separately, the storage cover being illustrated in cross-section.
FIG. 5 is a left-hand side elevational view of the magazine shown in FIG. 4.
Figure 6:
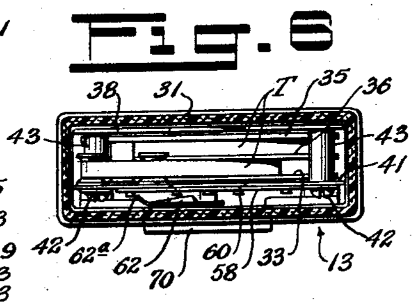
FIG. 6 is a horizontal cross-sectional view taken along the line 6—6 of FIG. 4 looking in the direction of the arrows.
Figure 23:
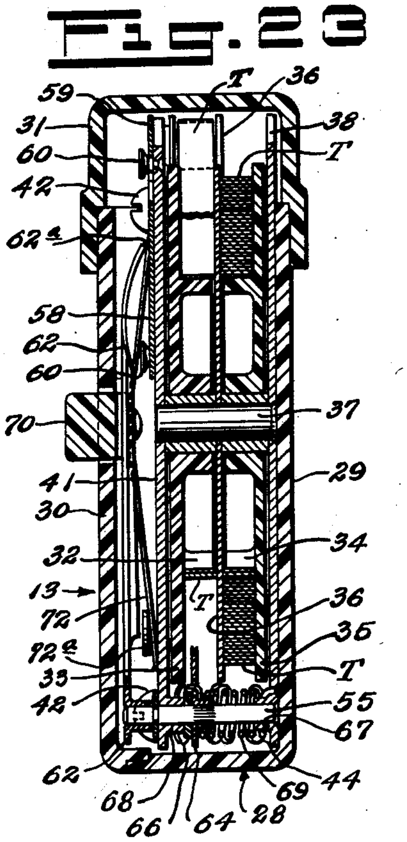
FIG. 23 is a vertical cross-sectional view, on an enlarged scale, of the tape magazine, taken along the line 23—23 of FIG. 4, in the direction of the arrows.

The replaceable tape magazine 13 will now be described, with reference to FIGS. 4, 5, 6, 7, 8, 11, 13, 14 and 23. The tape magazine 13 is housed in a box-like structure 28 of synthetic plastic material which is open at its upper end, and has a rectangular back member 29 and a transparent front cover member 30 secured to said back cover member upon assembly as by cement. As illustrated in FIGS. 4, 5 and 23, a dust cover 31 is provided for protection of the open end of the magazine when removed from the remainder of the dictating equipment.

The tape magazine 13 includes a tape take-up reel hub 32, having a flange 33, and a tape feed reel hub 34 having a flange 35, said reels being separated by a disc 36 and rotatably mounted on a common pin 37 fixed to a back plate 38 (FIG. 23). The back plate 38 is secured against the back member 29 of the magazine box structure by means of screws 39 entering tapped bosses 40 (FIGS. 7 and 8) provided in said back plate 38. The reels of magnetic tape T are held in place by a front plate 41 (FIG. 23) which is secured in place by screws 42 engaged into four tapped spacer posts 43 (FIG. 7) secured against the back plate 38.

Figure 7:
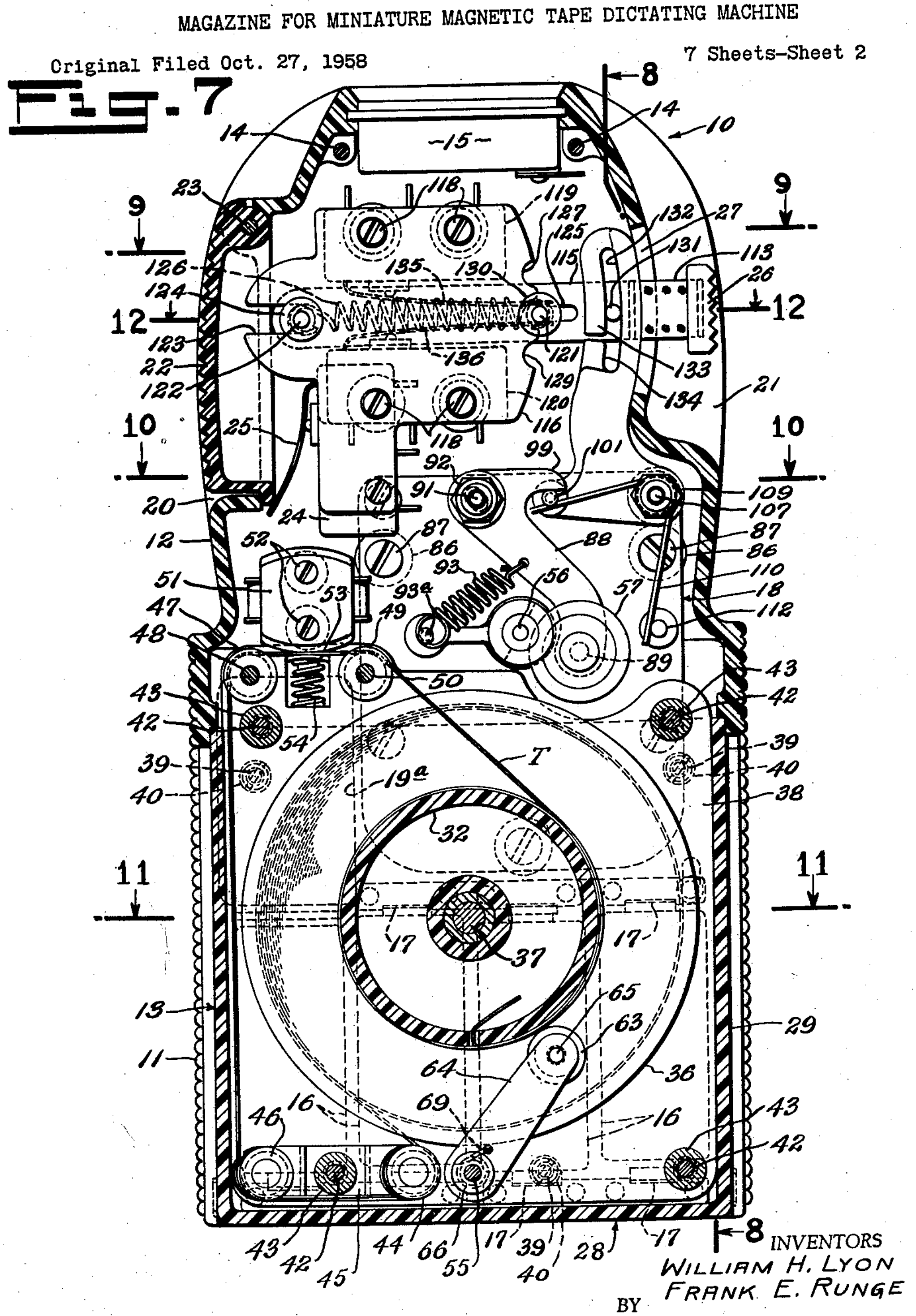
FIG. 7 is a vertical cross-sectional view of the dictating machine taken along the line 7—7 of FIG. 2, and on an enlarged scale, showing details of the operating mechanism.
Figure 11:
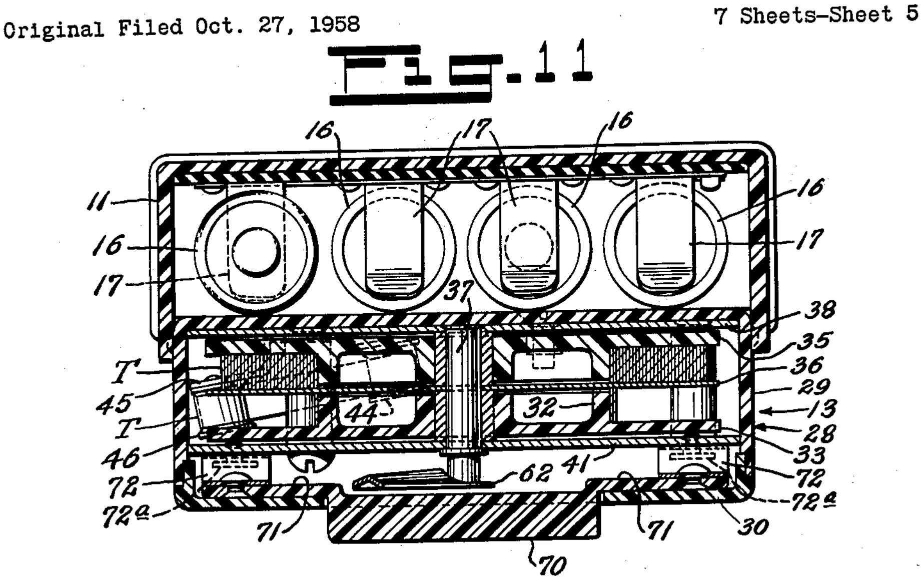
FIG. 11 is a horizontal cross-sectional enlarged view, taken along the line 11—11 of FIGS. 1, 7 and 8 looking in the direction of the arrows.

The tape T passes from the tape feed reel hub 34 around a roller 44 journalled at one end of a bracket 45 secured by clamping to the back plate 38 under the lower left-hand spacer post 43 as illustrated in FIGS. 7 and 11.

The tape T then moves up level with the plane of the take-up reel hub 32, where it passes over a roller 46 journalled at the other end of the bracket 45. The tape T then passes upwardly along the side of the magazine, as illustrated in FIG. 7 and moves over a first roller 47 journalled on a pin 48 fixed to the back plate 38 and then over a second roller 49 laterally spaced therefrom by a short distance and journalled on a pin 50 also fixed to the back plate 38.

Figures 13, 14:
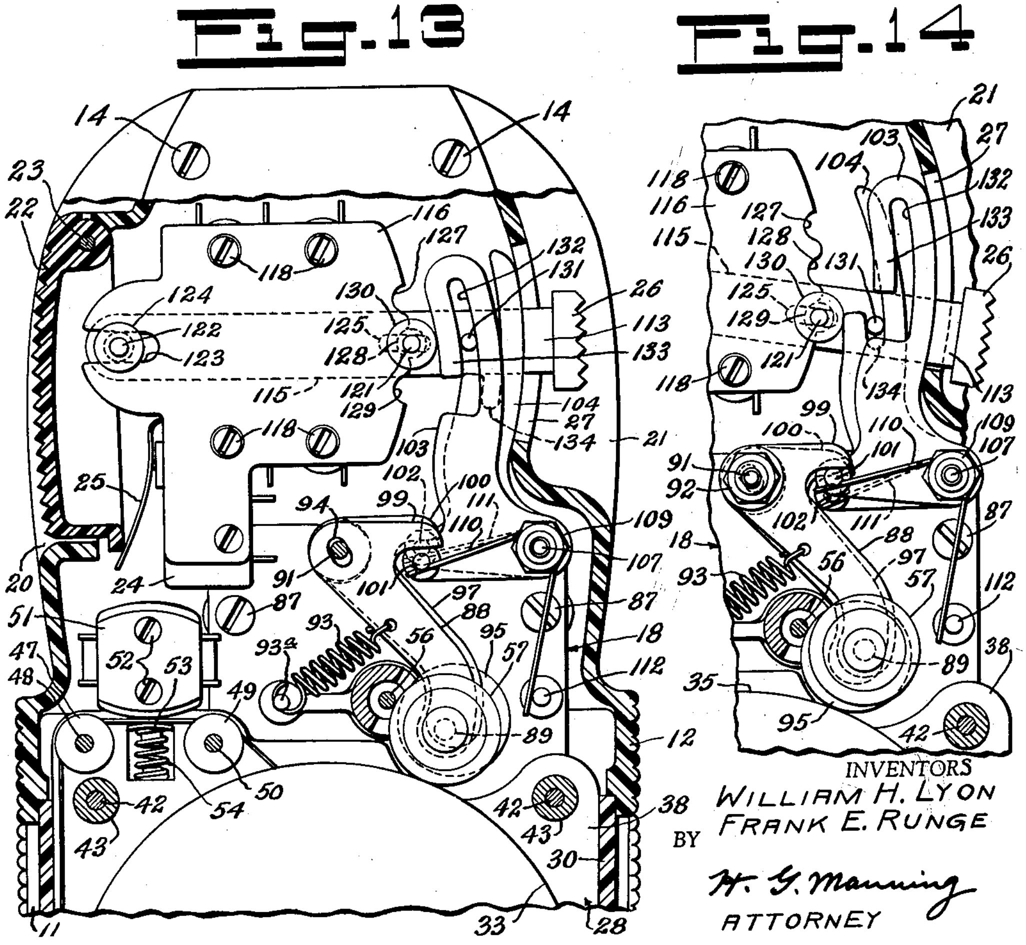
FIG. 13 is a partial vertical cross-sectional view of the dictating machine, similar to FIG. 7, but showing the mechanism actuated for listening or playback.
FIG. 14 is a view similar to a portion of FIG. 13, showing the mechanism actuated for rewinding.

The upper surface of the tape T where it passes between the first and second rollers 47 and 49 is adapted to contact a magnetic transducer head 51 secured within the back half 11 of the equipment case as by screws 52 (FIG. 13). The tape is held in close contact with the pole piece of the transducer head 51 by means of a pressure pad 53 acting from underneath the tape and resiliently urged upwardly by a coiled compression spring 54.

From the second roller 49 the tape T winds upon the take-up reel hub 32, the flange 33 of which is driven from the capstan 56 of the motor 18 through a forward drive roller 57 in the manner hereinbelow fully described.

*Indexing Mechanism*

Means is provided for indexing the material recorded on each magazine tape, the same comprising a detachable index card 58 having a tab 59 provided centrally at the upper end thereof (see FIG. 4). The index card 58 is held in place by openings in said card placed over rivets 60 provided in the front plate 41, and can readily be removed for replacement by pulling upward on the tab 59. The index card 58 is provided with a calibration scale 61 having lines representing minutes. The tape magazine is provided with a pointer 62 which indicates in time, the amount of tape T that has been wound upon the take-up reel hub 32.

The pointer 62 is driven by a roller 63 (FIG. 7) which is mounted at one end of an arm 64, journalled on a pin 65. The other end of the arm 64 is fixed to a pin 55 by means of which it rotates the pointer 62 which is also secured to said pin. The pin 55 is rotatably journalled between bearings 67 and 68 (FIG. 23) provided in the back plate 38 and the front plate 41, respectively. A torsion spring 69 surrounding the pin 55 has its ends secured between the back plate 38 and the arm 64 so as to urge said arm and its roller 63 against the tape T as it piles up on the take-up reel hub 32. A thrust washer 66 is provided between the arm 64 and the bearing 68.

*Logging*

Logging is accomplished by pressing the pointer 62 downward toward the log scale 61 in such a way that the curved tip 62*a* thereof scratches the surface of the index card 58. The scratch so made on the card 58 is visible through the transparent front cover member 30, and can be used during playback to locate recorded points on the tape T. The pointer 62 may be depressed for this purpose by pushing inwardly a horizontal rectangular button 70 extending through an opening in the front cover member 30 of the magazine case. The button 70 is held in place by integral bars 71, secured thereto and which are pressed by a pair of curved vertical leaf springs 72. The leaf springs 72 are secured at their upper ends by the screws 42 which hold the front plate 41 in place, and are guided at their lower ends by rivets 72*a* provided in the front plate 41 (see FIG. 8).

*Drive Motor*

Considering now the detailed construction of the drive motor 18, and referring to FIGS. 19, 20, 21 and 22, it will be seen that said motor is comprised of a rear casting 73 and a front casting 74 secured together by a pair of screws 75. The front casting 74 is provided with two spaced bearings 76, 77 aligned with each other and with a bearing 78 in the base casting 73.

The motor capstan 56 is journalled in the bearings 76, 77 and 78 and carries a rotor 79 located between the bearings 77 and 78, aligned with each other.

The rotor 79 is formed with a plurality of equally spaced peripheral magnetized poles 80 which operate the motor at a slow uniform speed suitable for directly driving the magnetic tape T in the magazine 13.

The rotor 79 is electrically driven by a pair of electro-magnetic coils 81, 82 which are energized from a two-phase A.C. source of current generated in the amplifier 19. The coils 81, 82 are securely mounted on the base casting 73 by headed screws 83. The magnetic flux from the coils 81, 82 is transmitted to the rotor 79 by two pairs of pole pieces 84, 85 respectively.

Figure 8:
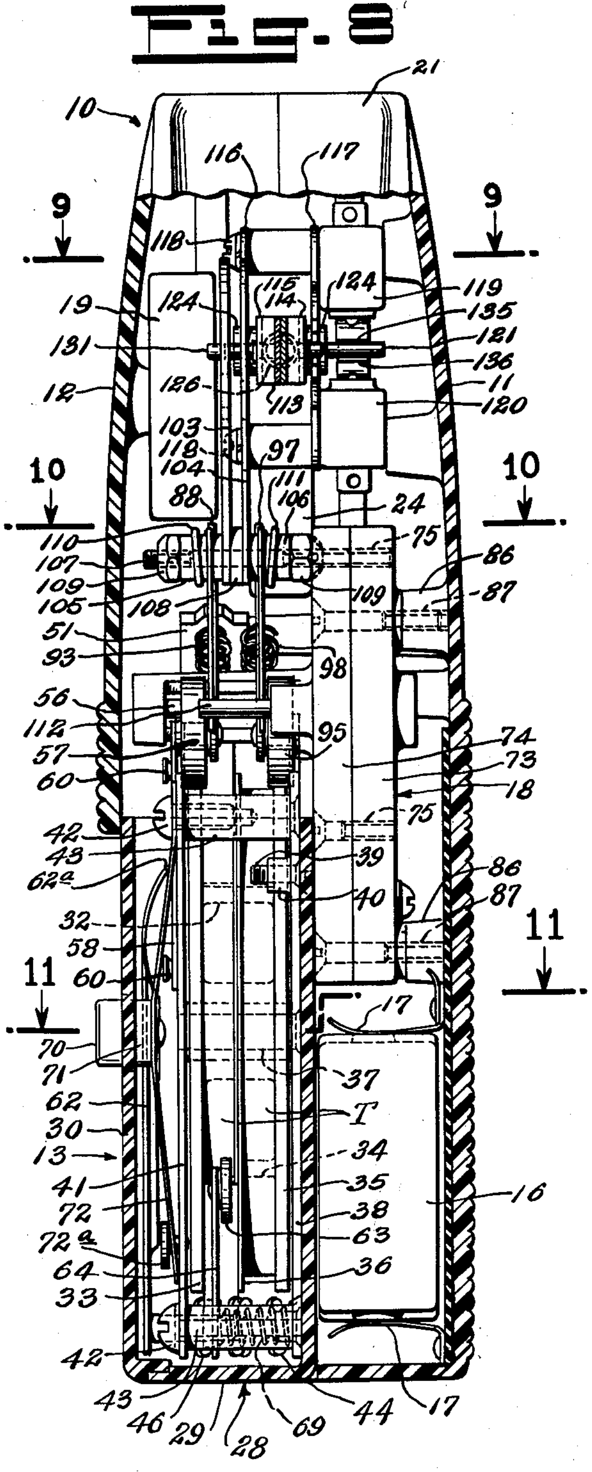
FIG. 8 is a vertical cross-sectional view taken along the broken line 8—8 of FIG. 7 looking in the direction of the arrows.
Figure 9:
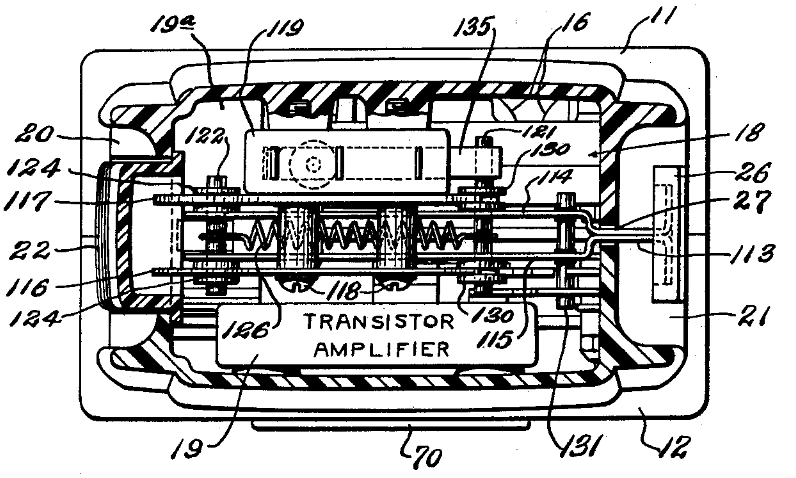
FIG. 9 is a horizontal cross-sectional view on an enlarged scale, taken along the line 9—9 of FIGS. 1, 7 and 8 looking in the direction of the arrows.
Figure 10:
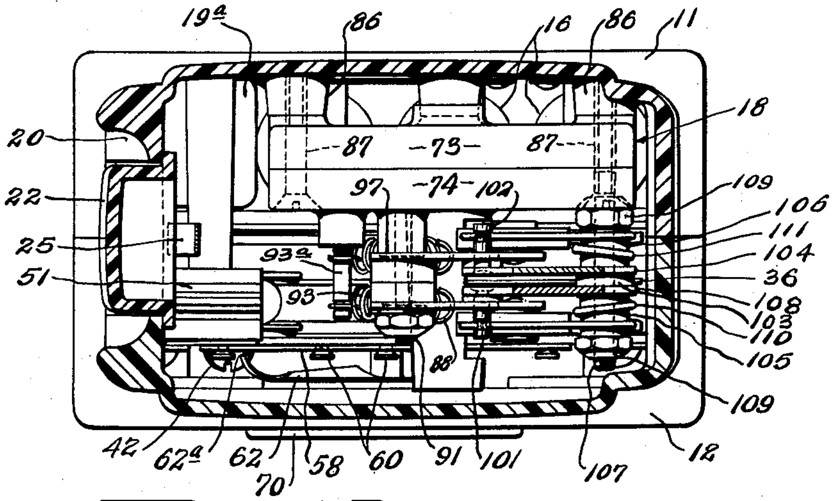
FIG. 10 is a horizontal cross-sectional enlarged view taken along the line 10—10 of FIGS. 1, 7 and 8, looking in the direction of the arrows.

As shown in FIGS. 8 and 10, the back half 11 of the machine case is formed with a plurality of bosses 86 against which the drive motor 18 is secured by flat-head screws 87.

*Tape Actuating Mechanism*

Figure 16:
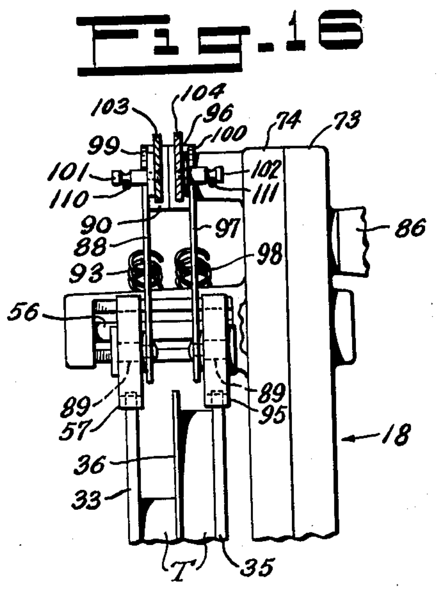
FIGS. 16 and 17 are side elevational views showing details of the tape drive clutch roller mechanism in unactuated and actuated condition for playback, respectively.
Figure 17:
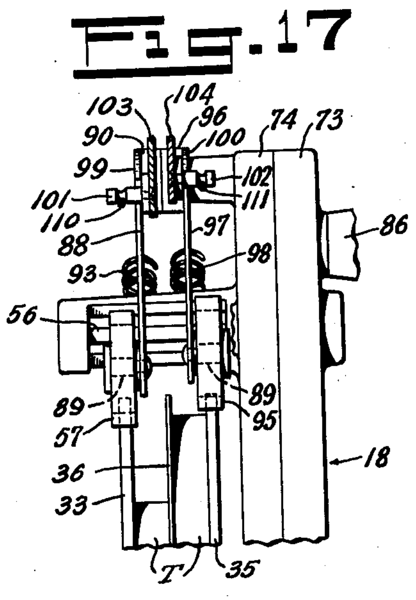
Figure 18:
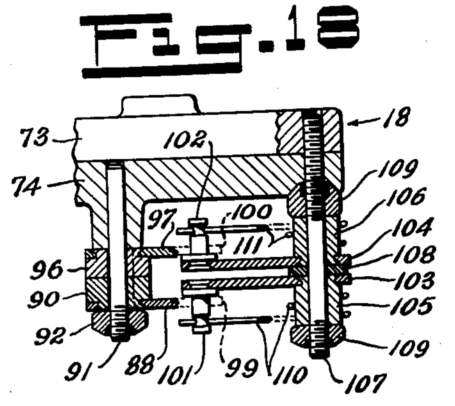
FIG. 18 is a horizontal cross-sectional view taken along the line 18—18 of FIG. 15.
Figure 19:
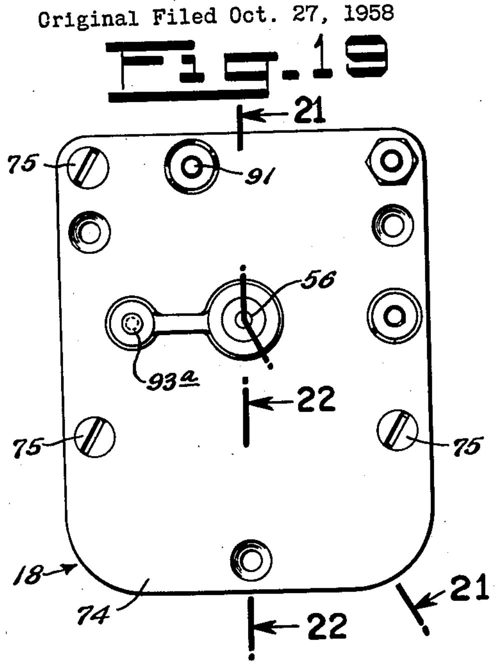
FIG. 19 is a front elevational view of the drive motor with the cover in assembled position.
Figure 20:
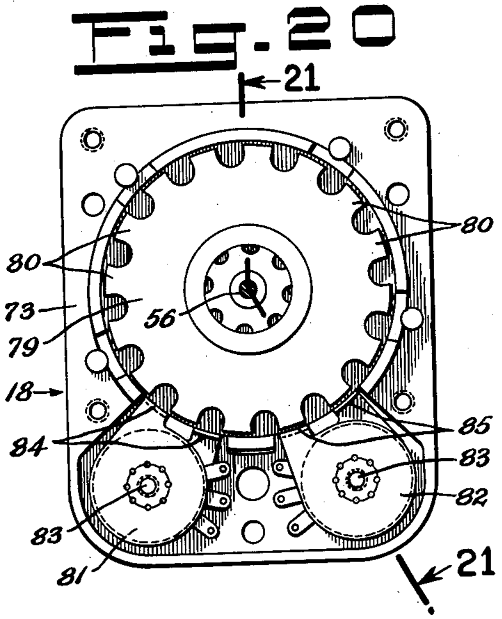
FIG. 20 is a view of the drive motor shown in FIG. 19, with the cover removed.
Figure 21:
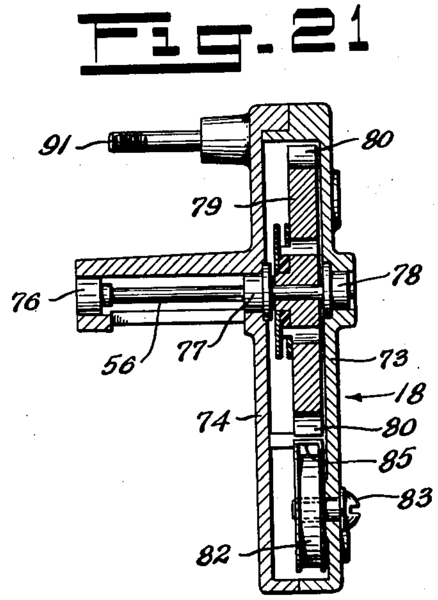
FIG. 21 is a vertical cross-sectional view taken along the broken line 21—21 of FIGS. 19 and 20 looking in the direction of the arrows.
Figure 22:
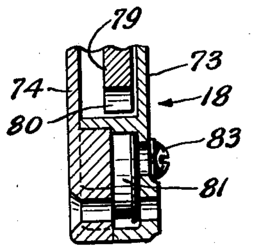
FIG. 22 is a vertical cross-sectional view, taken along the line 22—22 of FIG. 19 in the direction of the arrows.

Considering now the actuating mechanism interconnecting the drive motor 18 with the take-up reel and feed reel flanges 33 and 35, and referring first to FIG. 7, it will be seen that the forward drive roller 57 is rotatably mounted at one end of an arm 88 pivoted about a pin 89. As illustrated in FIGS. 16–18, the other end of the arm 88 is secured to a collar 90 which is pivoted on a stud pin 91, firmly secured to and extending outwardly from the top of the motor casting 74. The arm 88 is held in place on the pin 91 (FIG. 14) by means of a lock nut 92.

A coiled tension spring 93 (FIG. 7) is arranged between the arm 88 and a stud 93*a* provided on the motor top casting 74 to exert pressure on the drive roller 57 in the direction of the motor drive capstan 56 and the take-up reel flange 33. A slot 94 in the arm 88 and its collar 90 (see FIG. 13) permits accurate adjustment of the location of the roller 57 between the capstan 56 and the flange 33 when it is driving the tape T forward.

*Rewinding*

In order to re-wind the tape T on the feed reel hub 34, a re-wind roller 95 (FIGS. 13, 14 and 15) is arranged to be moved into engagement with the flange 35 of said feed reel hub. The re-wind roller is journalled at one end of an arm 97 similar to the arm 88. The other end of the arm 97 is fitted with a collar 96 (FIG. 18) which is pivoted on the stud pin 91 behind the collar 90 of the arm 88.

The collar 96 is provided with an elongated slot (not illustrated) similar to the slot 94 in the collar 90, to permit accurate positioning of the roller 95 between the capstan 56 and the feed reel hub flange 35 when driving the feed reel hub 34 in reverse. A coiled spring 98 (FIG. 16) similarly applies pressure to the re-wind roller 95 when it is in operation, said roller 95 being rotatably mounted on the pin 89.

Figure 15:
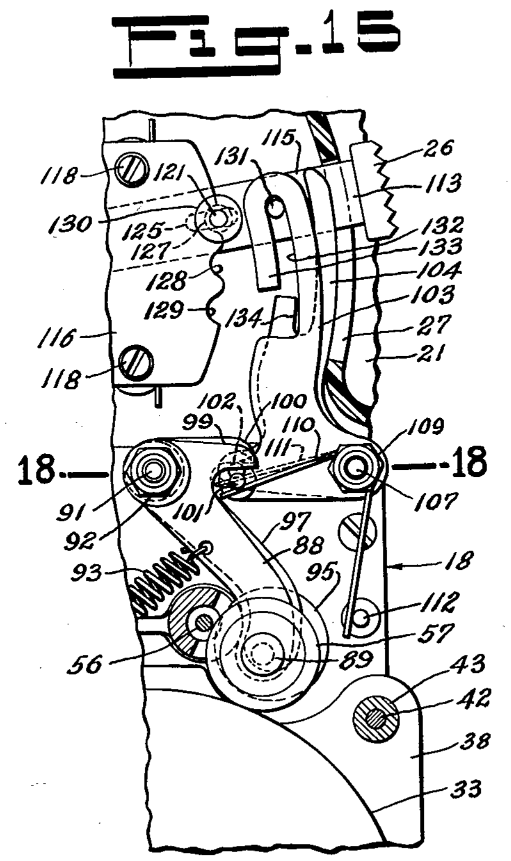
FIG. 15 is a view similar to FIG. 14, showing the mechanism actuated for recording.

The drive roller 57 and the rewind roller 95 are held in neutral positions normally by projections 99 and 100 forming part of the arms 88 and 97, respectively (see FIGS. 13, 14 and 15). The projections 99 and 100 rest on pins 101, 102, which are fixed to and extend outwardly from each side of a pair of drive actuators 103, 104, respectively (see FIGS. 13, 14, 15 and 18). The drive actuators 103, 104 are provided with fixed collars 105, 106, respectively, which are pivotally journalled on a common stud pin 107 secured to the top casting 74 of the motor 18, said actuators being held in place on said stud pin between a pair of lock nuts 109. A spring washer 108 is also provided on said pin 107 between the actuators 103, 104. Coiled torsion springs 110, 111 (FIGS. 10) surrounding the collars 105, 106 and acting between an abutment pin 12 (FIGS. 13, 14, 15 and 18) secured to the top casting 74 of the motor and the underside of the pins 101, 102, respectively, press said pins 101 and 102 upwardly with sufficient pressure to overcome the tension afforded by the tension springs 92, 98 acting upon the respective arms 88 and 97, and hold said arms in a neutral position.

When the drive actuator 103 (FIG. 13) is rotated counterclockwise about the stud pin 107, the pin 101 will be moved with relation to the projection 99 of the arm 88, and the drive roller 57 will be permitted to drop into contact with the capstan 56 and the flange 33 of the take-up reel hub 32, under the urging of the tension spring 93, whereupon the tape T will be driven in the forward direction.

When the drive actuator 104 is moved with relation to the projection 100 of the arm 97, the drive roller 95 is permitted to drop into contact with the capstan 56 and the flange 35 of the feed reel hub 34, whereupon the tape T will be driven in the reverse direction.

As hereinabove mentioned, pivotal movement of the selector button 26 (FIGS. 3, 7, 13, and 14) permits selection of "listen," "record" and "re-wind" by moving it into one of its three positions. Subsequent pressure on the button 26 causes any one of the three selected functions to operate. To this end, the button 26 is firmly attached to a lever 113 (see FIGS. 7, 9 and 12) formed with a pair of spaced parallel elongated members 114, 115, which extend between a pair of parallel detent plates 116, 117 secured against the inside of the back half 11 of the equipment case by screws 118. Secured between the inner detent plate 117 and the back half 11 of the casing are a pair of upper and lower microswitches 119, 120, respectively (FIGS. 7 and 8).

Figure 12:
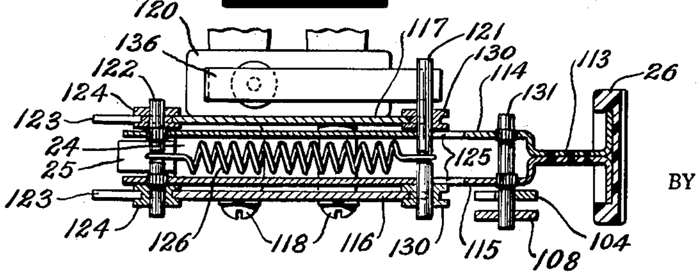
FIG. 12 is a horizontal cross-sectional view, taken along the line 12—12 of FIG. 7 in the direction of the arrows.

The spaced elongated members 114, 115 of the lever 113 are loosely attached to the detent plates 116, 117 by transverse pins 121, 122 (FIG. 12). The pin 122 is fixed to the elongated members 114, 115 and has its ends fitted with rollers 124 which ride in slots 123 in the respective detent plates 116, 117.

The pin 121 is freely attached to the elongated members 114, 115, operating in slots 125 therein and has rollers 130 at its outer ends which ride over the front edges of the respective detent plates 116, 117. A coiled tension spring 126 arranged between the spaced members

114, 115 of the lever 113 interconnects the pins 121, 122 and serves to urge the pin 122 inwardly so that its rollers 130 bear resiliently against the front edges of the detent plates 116, 117.

Upon manual pivotal movement of the button 26, the rollers 130 of the pin 122 can be moved selectively into one of the three "record," "listen" (or playback), and "re-wind" detent recesses 127, 128 and 129, respectively, in the detent plates 116, 117 (see FIG. 13).

*Tape Movement*

When the control lever 113 is in the "record" position, a transverse pin 131 (FIG. 12) fixed near the end of said lever will be constrained within an open slot 132 (FIGS. 13, 14, 15) forming part of a projection 133 of the drive actuator 103. Thereafter, when the lever 113 is pushed in by the button 26, the pin 131 will rotate the drive actuator 103 counterclockwise, causing the tape T to move in the forward direction by engaging the motor drive mechanism with the magazine take-up reel flange 33, as hereinabove explained.

It will be understood that when the control lever 113 is in the "listen" position, corresponding to engagement in the control detents 128 in the detent plates 116, 117 (see FIG. 13), the pin 131 will still be constrained in the slot 132 of the drive actuator 103, whereupon when the button 26 is pressed, the tape T in a like manner will be caused to be moved in the forward direction.

Moreover, when the control lever 113 is in the "re-wind" position, corresponding to engagement in detents 129 in the detent plates 116, 117 (see FIG. 14), the pin 131 will be out of the slot 132 of the drive actuator 103, and in a slot 134 of the drive actuator 104. Consequently, when the button 26 is depressed, the pin 131 will cause counterclockwise rotation of the drive actuator 104 and consequent clockwise rotation of the arm 97, permitting the rewind roller to contact the flange 35 of the feed reel hub 34, driving it backwards and thus re-winding the tape T.

When the lever 26 is in the "record" position, the pin 121 will actuate the microswitch 119 through a leaf spring 135 associated therewith (see FIGS. 7 and 8), and at the same time open the microswitch 120 through the leaf spring 136 associated therewith. The microswitches 119 and 120 are connected in circuit with the amplifier for recording.

When the lever 26 is in the "listen" and "re-wind" positions, the microswitch 120 will be closed and the microswitch 119 will be open, whereby the amplifier is placed into playback condition. The circuits for performing these operations, being conventional, are not illustrated or described in detail herein.

While there has been described and illustrated in this specification one form in which the invention may conveniently be embodied in practice, it is to be understood that this form is presented by way of example only and that the invention is not limited to the specific disclosure but may be modified and embodied in various other equivalent forms. In short, the invention includes all the modifications and embodiments coming within the scope of the following claims.

Having thus fully described the invention, what is claimed as new and for which it is desired to secure Letters Patent is:

1. In a tape recording magazine for dictating machines and the like, the combination comprising a casing, a journal pin in said casing, a feed-reel and a take-up reel mounted in spaced relation on said pin and freely rotatable on said pin in opposite directions, a recording tape windable from one reel to the other, roller guide mechanism in said casing for guiding said recording tape between said reels, said roller guide mechanism comprising means for resiliently presenting a portion of said tape for contacting said tape against a transducer head when said magazine is attached to a recording machine, and means forming an opening in said casing adjacent said resiliently-presenting means through which a transducer resiliently contacts a surface of said tape when said magazine is attached to such a machine.

2. A tape recording magazine as defined in claim 1, wherein each of said reels is provided with a single flange at its outer end, the inner ends of said reels are separated by a floating separator disc, and there is provided means forming an opening in said casing for exposing said flanges for contact with a driving member when said magazine is inserted into a recording machine.

3. A tape recording magazine as defined in claim 1, wherein recorded tape indicating means is provided comprising an index scale, a pointer having one end movable arcuately along said index scale and its other end fixed to a pivot pin journalled in said magazine, a roller arm fixed to said pivot pin at one end and having a roller at its other end in contact with the tape on said feed reel, and resilient means urging said roller arm in the direction of the tape on said feed reel.

4. A tape recording magazine as defined in claim 3, wherein index scale marking means is provided comprising an arcuate point portion at on end of said pointer and push button means for moving said pointer inwardly so that said point portion marks said scale.

5. A magazine as defined in claim 3 wherein there is provided a removable index scale on said magazine, a covering enclosing said index scale and said pointer, said covering being substantially transparent in the area of said index scale, and a resilient, manually-depressible button mounted in said cover, one side of said button being on the outside of said cover and the other side being positioned for contact with said pointer in any position, whereby depression of said button causes said pointer to be pressed against said index scale thus marking said scale.

6. A tape magazine for disctating machines and the like incorporating drive means and transducer means, said magazine comprising, in combination, a casing, a pin mounted in said casing, a pair of tape reels rotatably mounted on said pin, said reels each being provided with an outer flange, means forming a first opening in said casing adjacent said flanges for engagement with a driving member when said magazine is inserted into a machine, a tape guiding and positioning mechanism mounted in said casing and including a plurality of rollers for guiding a tape in passing from one reel to the other, said mechanism including a pair of spaced rollers adjacent an edge of said casing and a resilient pressure pad positioned between said rollers, said pad and said rollers all being in contact with the same surface of a tape, and means forming a second opening in said casing adjacent said pressure pad, whereby a transducer will automatically and resiliently contact the opposite surface of the tape and will be in register with said pressure pad when said magazine is inserted into a machine.

References Cited in the file of this patent

UNITED STATES PATENTS

| | | |
|---|---|---|
| 1,208,646 | Power | Dec. 12, 1916 |
| 2,463,001 | Shrader | Mar. 1, 1949 |
| 2,497,087 | Littlejohn | Feb. 14, 1950 |
| 2,633,305 | Kaylor | Mar. 31, 1953 |
| 2,668,021 | Gleason | Feb. 2, 1954 |
| 2,778,637 | Eash | Jan. 22, 1957 |
| 2,873,073 | Lekas | Feb. 10, 1959 |
| 2,912,179 | Schuyler | Nov. 10, 1959 |
| 2,914,620 | Dale | Nov. 24, 1959 |